United States Patent
Vojnovic et al.

(10) Patent No.: US 11,361,483 B2
(45) Date of Patent: *Jun. 14, 2022

(54) GRAPH PARTITIONING FOR MASSIVE SCALE GRAPHS

(71) Applicant: Microsoft Technology Licensing, LLC, Redmond, WA (US)

(72) Inventors: Milan Vojnovic, Cambridge (GB); Charalampos E. Tsourakakis, Pittsburgh, PA (US); Christos Gkantsidis, Ely (GB); Božidar Radunovic, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,754

(22) Filed: Dec. 20, 2018

(65) Prior Publication Data

US 2019/0385347 A1 Dec. 19, 2019

Related U.S. Application Data

(63) Continuation of application No. 13/872,156, filed on Apr. 29, 2013, now Pat. No. 10,198,834.

(51) Int. Cl.
*G06T 11/20* (2006.01)
(52) U.S. Cl.
CPC .................. *G06T 11/206* (2013.01)
(58) Field of Classification Search
CPC .................................................. G06T 11/206
See application file for complete search history.

(56) References Cited

U.S. PATENT DOCUMENTS

| | | | | |
|---|---|---|---|---|
| 5,729,466 | A * | 3/1998 | Bamji | G06F 17/5045 716/122 |
| 7,987,250 | B2 * | 7/2011 | Pai | G06K 9/6224 709/223 |
| 2003/0016220 | A1 * | 1/2003 | Cohen | G06T 11/206 345/440 |
| 2004/0243546 | A1 * | 12/2004 | Mishra | G06K 9/6218 |
| 2006/0015588 | A1 * | 1/2006 | Achlioptas | G06Q 10/107 709/220 |

(Continued)

OTHER PUBLICATIONS

Ailon, Nir, "Breaking the Small Cluster Barrier of Graph Clustering", Feb. 2013, ICML, pp. 1-25 (Year: 2013).*

*Primary Examiner* — Terrell M Robinson

(57) ABSTRACT

Graph partitioning for massive scale graphs is described, such as for graphs having vertices representing people and edges representing connections between people in a social networking system; or for graphs where the vertices represent other items and the edges represent relationships between the items. In various embodiments a graph data allocator receives a graph vertex and its edges and allocates the vertex to one of a plurality of clusters each associated with one or more computing devices. In various embodiments the allocation is made by optimizing an objective function which takes into account both a cost of edges between clusters and a cost related to sizes of the clusters. In some examples the cost related to sizes of the clusters comprises a convex function applied to each of the cluster sizes. In examples, computations on the graph data are carried out with reduced runtimes and communications cost.

20 Claims, 6 Drawing Sheets

(56) References Cited

U.S. PATENT DOCUMENTS

| | | | |
|---|---|---|---|
| 2006/0274062 A1* | 12/2006 | Zhang | G06K 9/6224 345/420 |
| 2008/0010304 A1* | 1/2008 | Vempala | G06K 9/6224 |
| 2011/0234594 A1* | 9/2011 | Charles | G06K 9/6224 345/440 |
| 2013/0013601 A1* | 1/2013 | Kabiljo | G06F 16/95 707/737 |
| 2013/0239100 A1* | 9/2013 | Andrade | G06F 8/433 717/156 |
| 2013/0339357 A1* | 12/2013 | Eldawy | G06F 16/9027 707/737 |
| 2014/0118355 A1* | 5/2014 | Vassilvitskii | G06T 11/206 345/440 |
| 2014/0143407 A1* | 5/2014 | Zhang | H04L 41/145 709/224 |
| 2014/0156633 A1* | 6/2014 | Duan | G06F 16/24545 707/713 |
| 2014/0156637 A1* | 6/2014 | Stout | G06Q 50/01 707/722 |
| 2014/0267301 A1* | 9/2014 | Yang | G06T 11/206 345/467 |
| 2014/0280143 A1* | 9/2014 | Milenova | G06F 16/285 707/737 |

\* cited by examiner

GRAPH PARTITIONING FOR MASSIVE SCALE GRAPHS

CROSS-REFERENCE TO RELATED APPLICATION

The present application is a continuation of U.S. application Ser. No. 13/872,156, filed Apr. 29, 2013, and is hereby incorporated by reference herein in its entirety.

BACKGROUND

Large scale graph data, for example, where vertices representing documents, people, products, or other items are linked by edges, is generated in many application domains. For example, in social networking, information retrieval, video conferencing, product recommendation systems, knowledge management systems and others.

Existing approaches for querying graph data and carrying out computations using graph data in order to control social networking systems, information retrieval systems and others are typically time consuming and often do not scale up well to web-scale applications where massive amounts of data are involved. For example, social networking graphs may have over 1 billion vertices, each representing a user and may have around 140 billion edges representing connections between users.

The embodiments described below are not limited to implementations which solve any or all of the disadvantages of known ways of processing graph data.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Graph partitioning for massive scale graphs is described, such as for graphs having vertices representing people and edges representing connections between people in a social networking system; or for graphs where the vertices represent other items and the edges represent relationships between the items. In various embodiments a graph data allocator receives a graph vertex and its edges and allocates the vertex to one of a plurality of clusters each associated with one or more computing devices. In various embodiments the allocation is made by optimizing an objective function which takes into account both a cost of edges between clusters and a cost related to sizes of the clusters. In some examples the cost related to sizes of the clusters comprises a convex function applied to each of the cluster sizes. In examples, computations on the graph data are carried out with reduced runtimes and communications cost.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a graph data allocation system for massive scale graphs, the system described is provided as an example and not a limitation. As those skilled in the art will appreciate, the present examples are suitable for application in a variety of different types of graph data allocation systems including where the graph data is of small to moderate size, such as thousands to hundreds of thousands of vertices.

Figure 1:
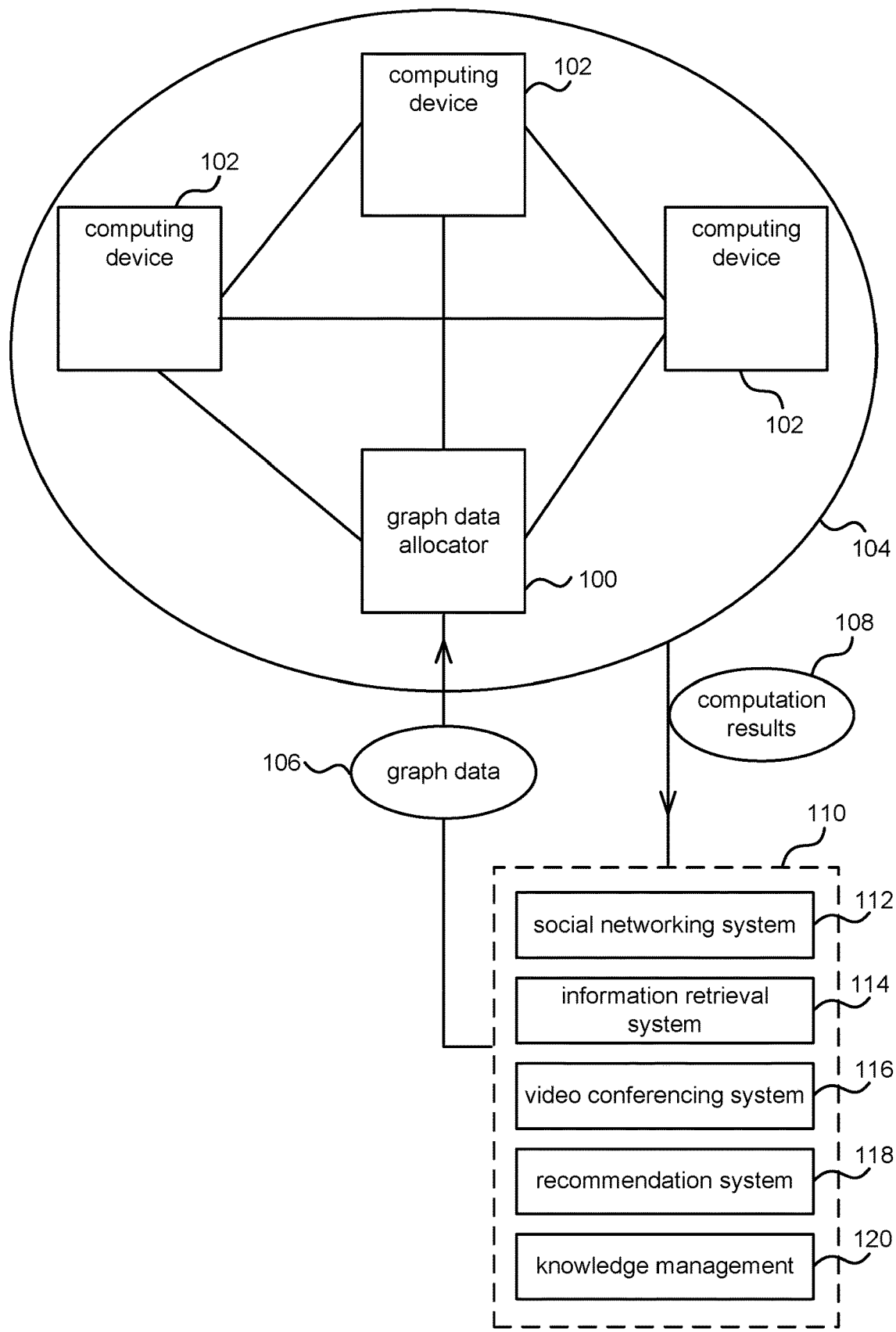
FIG. 1 is a schematic diagram of a graph data allocator for allocating graph data to clusters associated with computing devices.

FIG. 1 is a schematic diagram of a graph data allocator 100 for allocating graph data 106 to clusters associated with computing devices. The graph data allocator is computer implemented using software and/or hardware. It takes as input graph data 106 comprising a plurality of vertices at least some of which are connected by edges. The graph data may comprise some vertices which are not connected to any other vertices. The graph data allocator may receive or access the graph data 106 as a data stream from a system 110 to be controlled or influenced using the graph data. In some examples the graph data is stored (at the graph data allocator 100 or elsewhere) and is read by the graph data allocator 100 one vertex at a time as described in more detail below. Once the graph data is allocated it is referred to as being partitioned into clusters. Graph partitioning is an NP-hard problem.

Each graph vertex represents at least one item, such as a person, product, document, email account, video conference account, or other item. Each graph edge represents a relationship between items represented by the vertices it connects.

The system 110 to be controlled or influenced using the graph data is any computer implemented system which observes and/or records events that may be recorded as one or more connections between items represented as graph vertices. For example, the system 110 may be a social network system 112 which stores user accounts and enables connections to be made between user accounts and/or communications to be sent between user accounts. In this case the graph may be a social graph where operations are user interactions, defined through social engagements represented with graph edges. The system 110 may be an information retrieval system 114 which obtains addresses of documents or other items and information about links or other connections between the documents. The documents may be represented using graph vertices and the links between documents may be represented as edges. The system 110 may be a video conferencing system 116 which represents video conferencing accounts associated with people by graph vertices. Communication events between users of the video conferencing system may be represented using graph edges.

The system 110 may be a recommendation system 118 which uses features of users and products in order to recommend products to users. For example, a graph vertex may represent a user and/or a product and the edges may represent events such as whether a user has purchased a given product. The system may be a knowledge management system 120. For example, the graph may be a knowledge graph where vertices represent people, places and items and edges represent relationships such as "likes", "dislikes", "lives", or "works".

Once the graph data 106 is available it is possible to use the graph data 106 to control the system 110. For example, queries on the graph data 106 may yield results which are used to improve information retrieval results, improve recommendations, suggest new friends in social networks and for other purposes. However, for many situations the scale of the graph data 106 is so massive that it is not practical to carry out computations on the graph data in practical time scales.

The graph data may be partitioned into clusters whereby the clusters are smaller in size than the overall graph data 106. Each cluster may be stored at, or accessible to, one or more computing devices 102 at a data center or distributed at various locations and in communication with one another using a communications network 104. Computations may be carried out at the individual clusters and the results aggregated so as to enable massive scale graph data to be accommodated. For example, queries on the graph data may be large and each query may be carried out on many of the clusters. Computation results 108 may be sent to the system 110 and used to control that system. In some examples, the clusters may be used to carry out iterative computations over partitioned input graph data in a distributed cluster of machines. For example, ranking algorithms for ranking search results in information retrieval systems may be computed in this manner or other types of node centrality measures computed using iterative computations over partitioned input graph data.

However, it is not straightforward to partition the graph data into clusters in an optimal way. This is because of the massive number of possible ways of partitioning the graph data and the need to allocate the graph data quickly for practical applications. Also, when the graph is partitioned some of the edges will span between clusters which may be on different computing devices 102. This may introduce significant communications costs. Also, the computing devices 102 may become uneven with respect to their workloads.

Alternatively, or in addition, the functionality of the graph data allocator 100 described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 2:
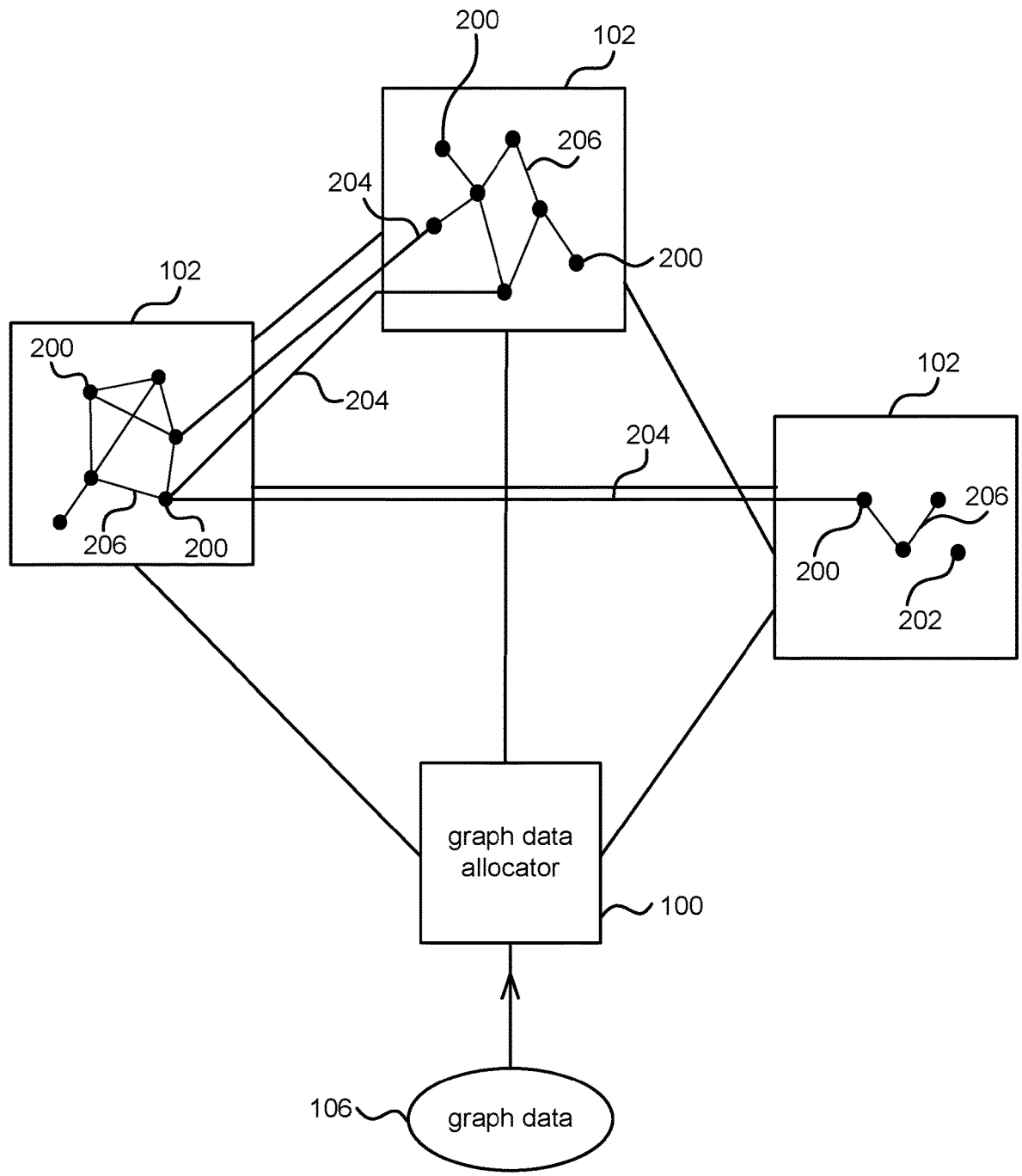
FIG. 2 is a schematic diagram of a graph partitioned into three clusters.

FIG. 2 is a schematic diagram of a graph partitioned into three clusters with each cluster being located at one of the three computing devices 102 of FIG. 1. This example has three clusters and three computing devices 102. However, other numbers of clusters and computing devices may be used. Also, it is not essential to use one computing device for one cluster.

The computing devices 102 are connected to one another via communications links of any suitable type. These communications links may be within a data center and/or may connect the computing devices 102 between remote locations over communications networks.

In the example of FIG. 2 each cluster comprises a plurality of graph vertices (shown as black blobs) connected (except in the case of loners) by edges 204, 206. Some of the edges 206 are within clusters and some are between clusters 204.

The graph data allocator 100 receives graph data 106 in the same way as described above with respect to FIG. 1 and allocates the graph vertices to the clusters. The allocation process may be "on the fly" in order to be workable for practical applications. It is also possible for the allocation process to be offline. Methods for allocating the graph vertices are now described with reference to FIG. 3.

The graph data allocator 100 accesses (or knows) the topology 308 of the current graph (the part that has already been allocated to clusters) with respect to the clusters. The number of clusters may be pre-specified for example, by user input or using default values according to the application domain. At the start of the process the clusters may be empty and as the process proceeds the clusters fill up so that the topology of the current graph becomes more complex.

The graph data allocator 100 accesses 310 a graph vertex and its edges from the graph data 106. This may be done by randomly selecting a graph vertex from the graph data 106 or by following a breadth first 304 or depth first 306 sequence through the graph data starting from a random start position. Any other way of selecting 300 or accessing 310 a graph vertex which has not already been allocated to a cluster may be used. For example, multiple crawlers may crawl a graph in parallel. Each may execute a depth first or breadth first search locally. The results of the crawlers may be merged to create a stream arriving at the allocator.

The selected vertex is allocated to one of the plurality of clusters by optimizing 312 an objective function which takes into account both a cost of edges between clusters and a cost related to sizes of clusters. Once the allocation is made the topology is updated 330 and the process selects the next graph vertex 310 or ends if all the graph vertices have been allocated.

Figure 3:
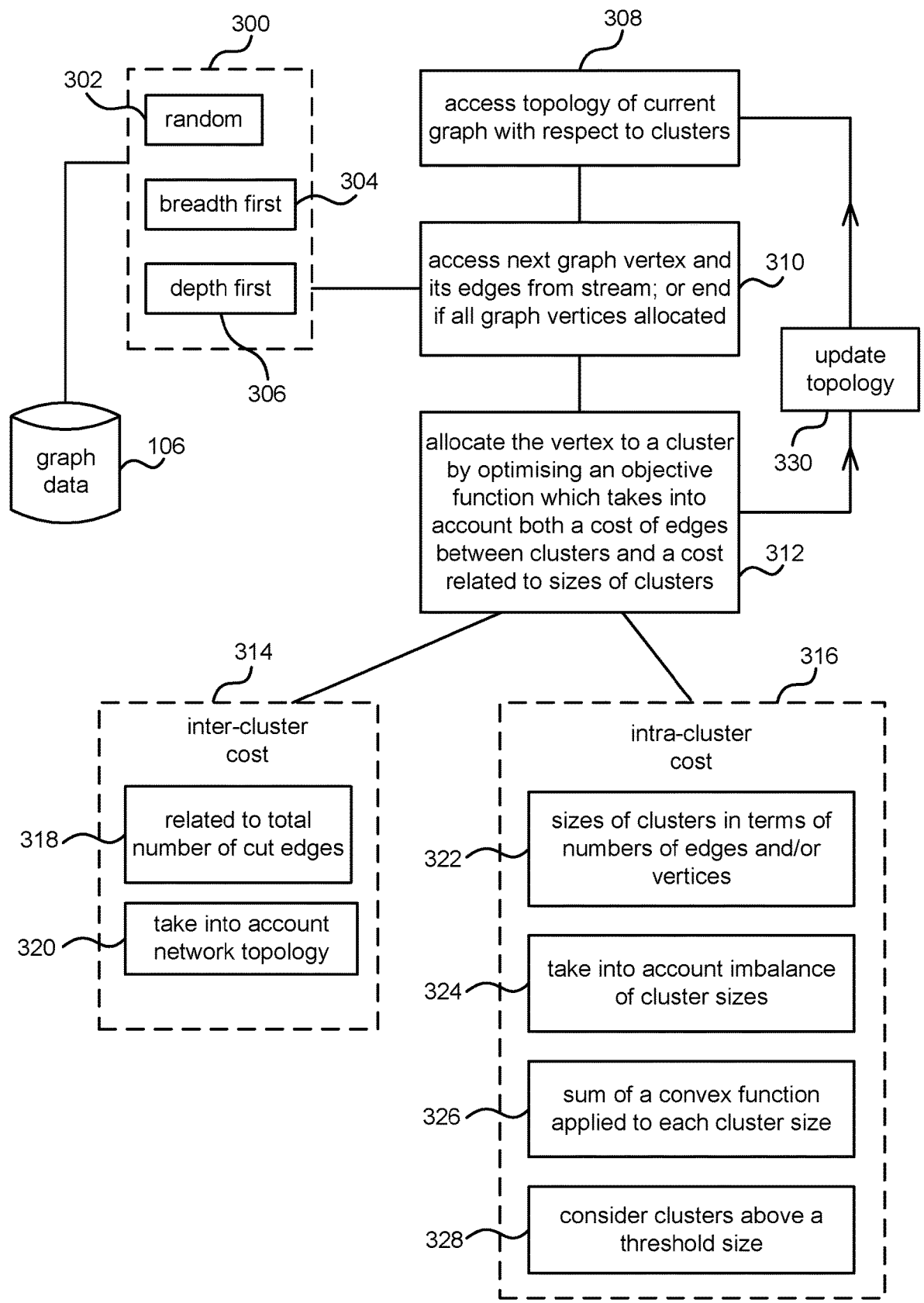
FIG. 3 is a flow diagram of a method at a graph data allocator.

The allocation process of FIG. 3 may be referred to as a "greedy allocation" process because once a vertex is allocated to a cluster it remains there whilst the remaining graph data 106 is processed. The allocation process is able to efficiently partition massive scale graphs with a single pass through the graph data 106. The resulting partitions are found to give runtime and communications improvements as compared with previous approaches. However, it is also possible to use multiple passes through the graph while partitioning. For example, when the system is otherwise idle.

The objective function takes into account both a cost of edges between clusters (referred to as inter-cluster cost 314) and a cost related to sizes of clusters (referred to as intra-cluster cost 316). The objective function with the two types of costs gives a unifying framework for graph partitioning. This is because the two types of costs may be adjusted with respect to one another in a simple and effective manner using parameters in the objective function. In this way, a user is able to adjust the parameter values in order to control the influence of the inter-cluster and the intra-cluster costs on the allocation process. For example, according to the application domain the influence of the different costs may need to be adjusted.

The objective function overcomes the computational complexity of traditional approaches to graph partitioning. This is because no hard constraints to the objective function are specified. As a result the graph partitioning process may be computed extremely quickly and scales up to massive scale graphs.

For example, the objective function may consist of two elements: the inter-partition cost $C_{OUT}$ and the intra-partition cost $C_{IN}$. These functions may be assumed to be increasing and super-modular (or convex). For every given partition of vertices $\mathcal{P} = (S_1, S_2, \ldots, S_k)$, a global objective function may be defined as $$f(\mathcal{P}) = C_{OUT}(|e(S_1, V\backslash S_1)|, \ldots, |e(S_k, V\backslash S_k)|) + C_{IN}(\sigma(S_1), \ldots, \sigma(S_k))$$

Where $e(S, V\backslash S)$ is the set of edges whose one end-vertex is in the set S and the other is not; and where a is a mapping to the set of real numbers.

The inter-cluster cost 314 may be related to the total number of cut edges. A cut edge is an edge which spans between two clusters. In the example of FIG. 2 there are 3 cut edges. In various examples described here the inter-cluster cost is computed as a linear function of the total number of cut edges resulting from a partition. This may be used where an identical cost is incurred per each edge cut, e.g. in cases where messages are exchanged along cut edges and these messages are transmitted through some common network bottleneck.

In some examples, the communications links between the computing devices are uneven in some way, for example, because the computing devices are linked in a torus, or because the bandwidths of the communications links between the computing devices are not equal. In this case, the inter-cluster cost 314 may take into account network topology 320 or communications bandwidths. However, this is not essential.

The intra-cluster cost 316 relates to sizes of the clusters. These sizes may be measured in terms 322 of numbers of edges and/or vertices. The number of edges of a cluster may be the number of edges with at least one vertex in the cluster or it may be the number of edges with both end vertices in the cluster. The intra-cluster cost 316 for example, is arranged to take into account imbalance 324 of cluster sizes. For example, where a cluster becomes overloaded it's associated computing device(s) may perform inefficiently.

In some examples, imbalance of cluster sizes is taken into account by calculating the intra-cluster cost as a sum (or other aggregation) of a convex function applied to each cluster size 326. For example, a goal may be to balance the cost across different partitions and this case is accommodated by defining $C_{IN}(\sigma(S_1), \ldots, \sigma(S_k)) = \Sigma_{i=1}^{k} c(\sigma(S_i))$ where $c(x)$ is a convex increasing function such that $c(0)=0$. In this case the intra-partition cost function, being defined as a sum of convex functions of individual cluster sizes, tends to balance the cluster sizes, since the minimum is attained when sizes are equal.

The convex function $c(x)$ may be chosen from the following family of functions $c(x) = ax^\gamma$ for $\alpha > 0$ and $\gamma \geq 1$ By the choice of the cluster imbalance parameter $\gamma$ this family of cost functions allows the graph data allocator to control how much the imbalance of cluster sizes is accounted for in the objective function. Where this parameter tends to 1 the objective tends to minimizing the number of cut edges. By taking larger values for the cluster imbalance parameter $\gamma$ the more weight is put on the cost of partition imbalance.

In some examples the scaling parameter $\alpha$ may be chosen as follows where m is the absolute number of edges and n is the absolute number of vertices:

$$\alpha = m \frac{k^{\gamma-1}}{n^\gamma}.$$

However, this is not essential. Other values of the scaling parameter $\alpha$ may be used.

In some examples, the intra-cluster cost 316 is arranged to consider clusters above a threshold size 328. For example, clusters which are deminimis may be omitted from the intra-cluster cost in order to reduce computation time for calculating the objective function. For example, clusters whose load is at most $$\upsilon \times \frac{n}{k}$$

may be considered and other clusters omitted. Parameter $\upsilon$ may be set to 1.1 as a reasonable load balancing factor for real world settings. However, other values of parameter $\upsilon$ may be used.

It has unexpectedly been found using empirical investigation that using the value 1.5 for the cluster imbalance parameter $\gamma$ of the convex function gives good results. This is for situations where the graph has a skewed distribution, as happens with the majority of real world networks. However, it is also possible to use other values of the cluster imbalance parameter $\gamma$.

In some examples the graph data 106 changes over time. For example as social network connections are added or removed, as links between documents are added or removed or as new products become known to product recommendation systems. In this case, the new graph data may be partitioned again by making a pass through the new graph data and using the process of FIG. 3. For example, changes to the graph data are observed 400 and a new graph partition is computed by optimizing the objective function 402 as described above with reference to FIG. 3. The vertices are reallocated 404 between the clusters according to the newly computed partition.

Figure 5:
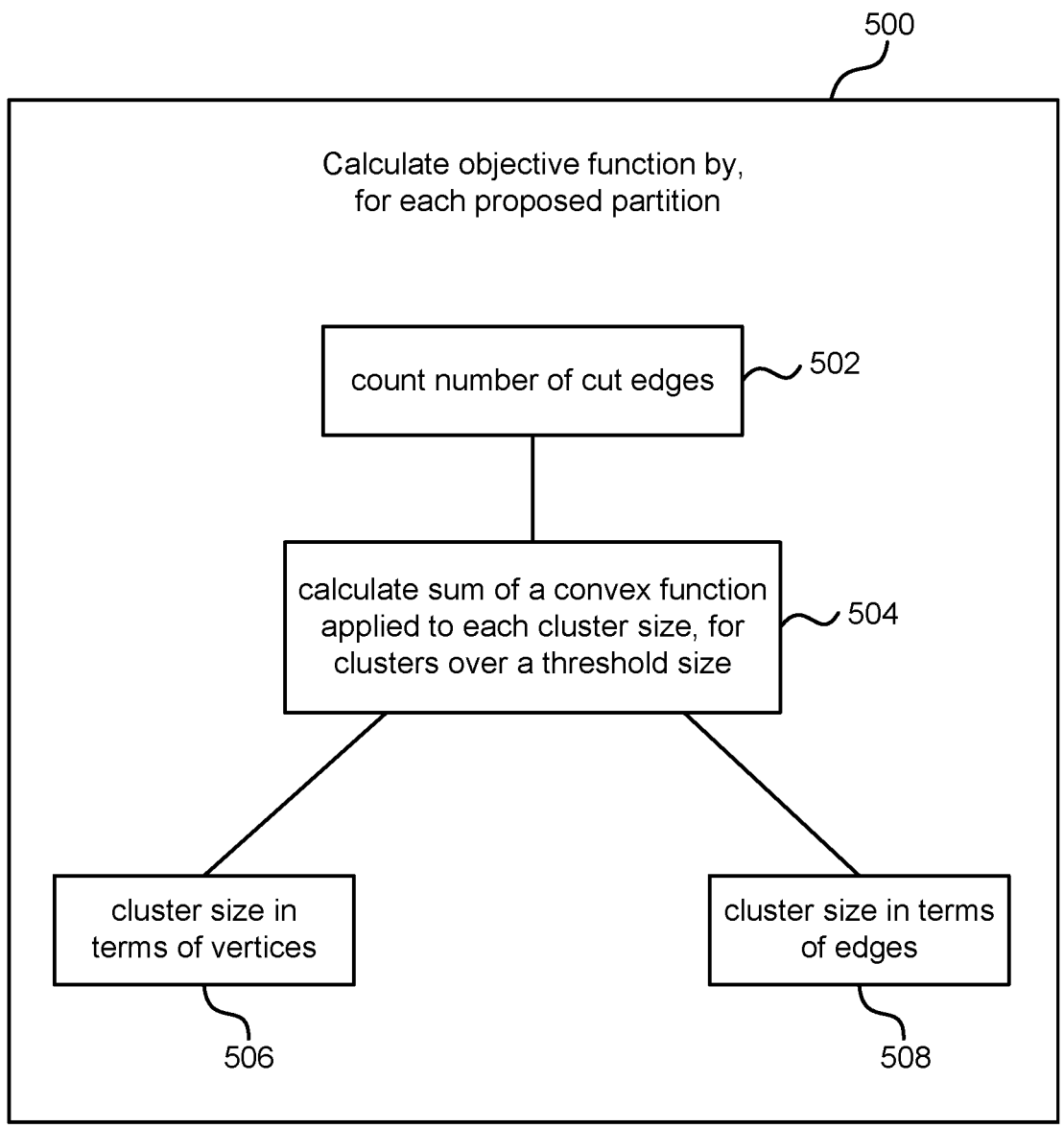
FIG. 5 is a flow diagram of part of the method of FIG. 3 in more detail.

FIG. 5 is a flow diagram of examples of the method of step 312 of FIG. 3 in more detail. Step 312 of FIG. 3 comprises optimizing an objective function. This may be achieved by calculating the objective function for possible partitions of the graph data and selecting an optimal partition according to the results. For example, there may be k possible partitions where k is the number of clusters and where a graph vertex is to be allocated to one of the partitions.

In the example of FIG. 5 one term of the objective function may be calculated by counting the number of cut edges 502 that would result from a proposed partition. This may give an inter-cluster cost 314. A second term of the objective function may be calculated 504 as a sum (or other aggregation) of a convex function applied to each cluster size, for clusters over a threshold size, and where the cluster size is in terms of vertices 506 or in terms of edges 508.

Figure 6:
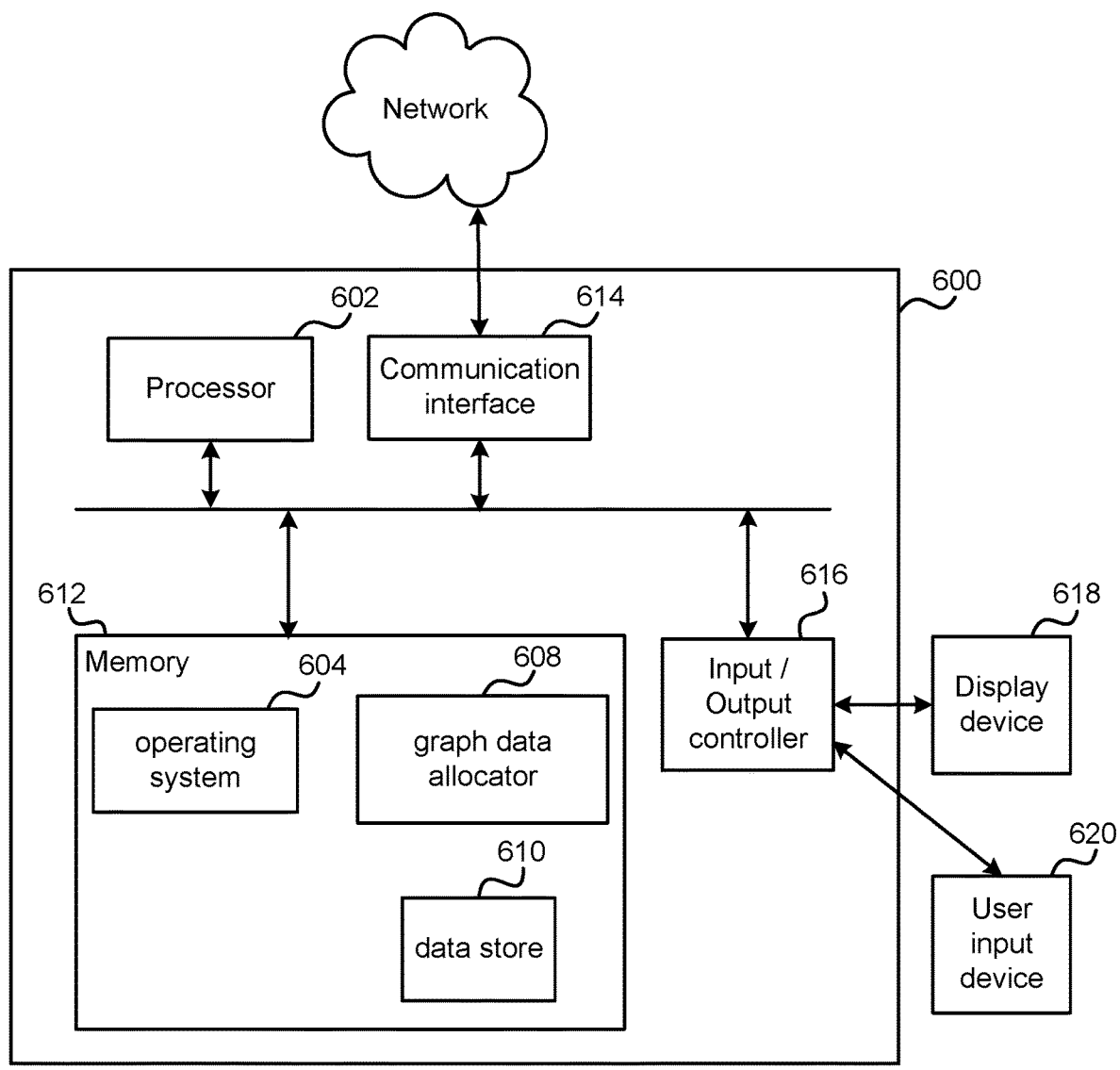
FIG. 6 illustrates an exemplary computing-based device in which embodiments of a graph data allocator may be implemented.

FIG. 6 illustrates various components of an exemplary computing-based device 600 which may be implemented as any form of a computing and/or electronic device, and in which embodiments of a graph data allocator may be implemented.

Figure 4:
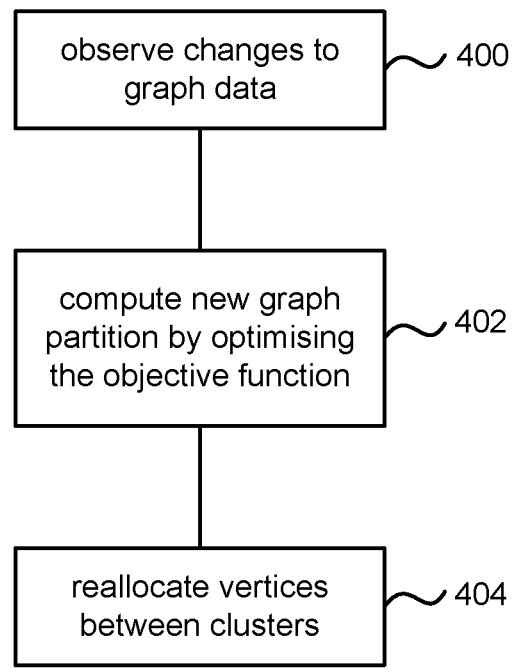
FIG. 4 is a flow diagram of another method at a graph data allocator.

Computing-based device 600 comprises one or more processors 602 which may be microprocessors, controllers or any other suitable type of processors for processing computer executable instructions to control the operation of the device in order to allocate graph data to clusters where the clusters are associated with computing devices. In some examples, for example where a system on a chip architecture is used, the processors 602 may include one or more fixed function blocks (also referred to as accelerators) which implement a part of the method of graph data allocation in hardware (rather than software or firmware). Platform software comprising an operating system 604 or any other suitable platform software may be provided at the computing-based device to enable application software to be executed on the device. A graph data allocator 608 may have the functionality described above with reference to any of FIGS. 3, 4 and 5.

The computer executable instructions may be provided using any computer-readable media that is accessible by computing based device 600. Computer-readable media may include, for example, computer storage media such as memory 612 and communications media. Computer storage media, such as memory 612, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 612) is shown within the computing-based device 600 it will be appreciated that the storage may be distributed or located remotely and accessed via a network or other communication link (e.g. using communication interface 614).

The computing-based device 600 also comprises an input/output controller 616 arranged to output display information to a display device 618 which may be separate from or integral to the computing-based device 600. The display information may provide a graphical user interface. The input/output controller 616 is also arranged to receive and process input from one or more devices, such as a user input device 620 (e.g. a mouse, keyboard, camera, microphone or other sensor). In some examples the user input device 620 may detect voice input, user gestures or other user actions and may provide a natural user interface (NUI). This user input may be used to set parameter values, specify addresses of graph data stores, specify numbers of clusters, specify cost functions or for other purposes. In an embodiment the display device 600 may also act as the user input device 620 if it is a touch sensitive display device. The input/output controller 616 may also output data to devices other than the display device, e.g. a locally connected printing device.

Any of the input/output controller 600, display device 618 and the user input device 620 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
receiving, at a processor, a vertex of a graph to be allocated into one of a plurality of clusters into which at least part of the graph is partitioned;
selecting one of the clusters to allocate the vertex to by optimizing an objective function which comprises a cost related to edges of the graph between clusters and a cost related to sizes of at least some of the clusters, wherein each of the at least some of the clusters include one or more edges with both end vertices in the cluster and one or more edges that have one end vertex in the cluster and another end vertex in another of the at least some of the clusters, and wherein a size of the at least some of the clusters is based on a number of edges with both end vertices in each of the at least some of the clusters and not a number of edges with only one end vertex in each of the at least some of the clusters; and
allocating the vertex to the selected one of the clusters.

2. A method as claimed in claim 1 comprising accessing information about the clusters and optimizing the objective function by calculating costs using the accessed information.

3. A method as claimed in claim 2 where the accessed information comprises: the number of edges between clusters; and the sizes of at least some of the clusters in terms of any one or more of: number of vertices, number of edges with both end vertices in the cluster, number of edges with only one end vertex in the cluster.

4. A method as claimed in claim 1 comprising updating the clusters with the allocated vertex, receiving a next vertex and selecting one of the clusters to allocate the next vertex to by optimizing the objective function.

5. A method as claimed in claim 1 wherein the cost related to edges of the graph between clusters is related to a total number of edges of the graph between clusters.

6. A method as claimed in claim 1 wherein the cost related to the sizes of at least some of the clusters comprises a convex function applied to the sizes of at least some of the clusters.

7. A method as claimed in claim 6 wherein the convex function comprises an imbalance parameter which controls an influence, in the objective function, of the cost related to the sizes of at least some of the clusters.

8. A method as claimed in claim 7 wherein the imbalance parameter is user controllable.

9. A method as claimed in claim 6 wherein the convex function comprises a scaling parameter.

10. A method as claimed in claim 1 wherein the cost related to the sizes of at least some of the clusters comprises a sum of a convex function applied to each of the sizes of at least some of the clusters which are above a threshold size.

11. A method as claimed in claim 1 where the sizes of at least some of the clusters is calculated in terms of any one or more of: number of vertices, number of edges with both end vertices in the cluster, number of edges with only one end vertex in the cluster.

12. A method as claimed in claim 1 which is repeated to enable partitioning of a massive scale graph having at least millions of vertices in one pass through the vertices.

13. A computer-implemented method comprising:
receiving, at a processor, a vertex of a graph to be allocated into one of a plurality of clusters into which at least part of the graph is partitioned; receiving a value of a parameter;
selecting one of the clusters to allocate the vertex to by optimizing an objective function which comprises a cost related to edges of the graph between clusters and a cost related to sizes of at least some of the clusters, an influence of the cost related to sizes of at least some of the clusters being controlled by the parameter, wherein each of the at least some of the clusters include one or more edges with both end vertices in the cluster and one or more edges that have one end vertex in the cluster and another end vertex in another of the at least some of the clusters, and wherein a size of the at least some of the clusters is based on a number of edges with both end vertices in each of the at least some of the clusters and not a number of edges with only one end vertex in each of the at least some of the clusters; and
allocating the vertex to the selected one of the clusters.

14. A method as claimed in claim 13 wherein the cost related to sizes of at least some of the clusters comprises a convex function applied to the sizes of at least some of the clusters.

15. A method as claimed in claim 14 wherein the parameter is a parameter of the convex function.

16. A method as claimed in claim 13 which is repeated to enable partitioning of a massive scale graph having at least millions of vertices in one pass through the graph vertices.

17. A graph data allocator comprising:
a processor arranged to receive a vertex of a graph to be allocated into one of a plurality of clusters into which at least part of the graph is partitioned;
the processor being arranged to select one of the clusters to allocate the vertex to by optimizing an objective function which comprises a cost related to edges of the graph between clusters and a cost related to sizes of at least some of the clusters, wherein each of the at least some of the clusters include one or more edges with both end vertices in the cluster and one or more edges that have one end vertex in the cluster and another end vertex in another of the at least some of the clusters, and wherein a size of the at least some of the clusters is based on a number of edges with both end vertices in each of the at least some of the clusters and no a number of edges with only one end vertex in each of the at least some of the clusters; and
a communications interface arranged to allocate the vertex to the selected one of the clusters.

18. A graph data allocator as claimed in claim 17 the communications interface arranged to allocate the vertex by sending a message to a computing device associated with the selected one of the clusters.

19. A graph data allocator as claimed in claim 17 wherein the cost related to sizes of at least some of the clusters comprises a convex function applied to the sizes of at least some of the clusters.

20. A graph data allocator as claimed in claim 17 being at least partially implemented using hardware logic selected from any one or more of: a field-programmable gate array, a program-specific integrated circuit, a program-specific standard product, a system-on-a-chip, a complex programmable logic device.

* * * * *